(12) United States Patent
Lee et al.

(10) Patent No.: US 10,178,732 B2
(45) Date of Patent: Jan. 8, 2019

(54) BACKLIGHT UNIT, METHOD OF DRIVING THE SAME, AND DISPLAY DEVICE INCLUDING THE SAME

(71) Applicant: SAMSUNG DISPLAY CO., LTD., Yongin-si, Gyeonggi-do (KR)

(72) Inventors: Sanghyun Lee, Yongin-si (KR); Hyejung Hong, Yongin-si (KR)

(73) Assignee: SAMSUNG DISPLAY CO., LTD., Yongin-si, Gyeonggi-do (KR)

(*) Notice: Subject to any disclaimer, the term of this patent is extended or adjusted under 35 U.S.C. 154(b) by 0 days.

(21) Appl. No.: 15/589,488

(22) Filed: May 8, 2017

(65) Prior Publication Data

US 2017/0325307 A1  Nov. 9, 2017

(30) Foreign Application Priority Data

May 9, 2016  (KR) .......................... 10-2016-0056631

(51) Int. Cl.
*H05B 37/02* (2006.01)
*H05B 33/08* (2006.01)
(Continued)

(52) U.S. Cl.
CPC ....... *H05B 33/0851* (2013.01); *G09G 3/3406* (2013.01); *H05B 33/083* (2013.01); *G02F 1/1336* (2013.01)

(58) Field of Classification Search
CPC ............ H05B 33/0815; H05B 33/0827; H05B 33/0818; H05B 33/0851; H05B 33/0845;
(Continued)

(56) References Cited

U.S. PATENT DOCUMENTS

| 2006/0043911 A1* | 3/2006 | Shao ................. H05B 33/0815 315/291 |
| 2010/0019697 A1* | 1/2010 | Korsunsky ......... H05B 33/0818 315/307 |

(Continued)

FOREIGN PATENT DOCUMENTS

KR  10-2013-0027854 A   3/2013
KR  10-2013-0135775 A  12/2013

OTHER PUBLICATIONS

Technology Trends of Visible Light Communication Coupled with LED Illumination, ETRI Electronics and Telecommunications Trends vol. 25 No. 4, Aug. 2010 (with English Abstract).

*Primary Examiner* — Wei Chan
(74) *Attorney, Agent, or Firm* — Lee & Morse, P.C.

(57) ABSTRACT

A backlight unit of a display device includes a power converter to generate a light source voltage in response to a power control signal, a light emitting element connected between a first node and a second node, and a light source controller connected to the second node and to output the power control signal in response to a dimming signal. The light emitting element receives the light source power voltage through the first node. When a feedback voltage of the second node is lower than a first reference voltage, the light source controller outputs the power control signal having a first pulse width based on the feedback voltage and the dimming signal. When the feedback voltage is higher than the first reference voltage, the light source controller outputs the power control signal having a second pulse width based on a voltage lower than the feedback voltage and the dimming signal.

17 Claims, 5 Drawing Sheets

(51) Int. Cl.
*G09G 3/34* (2006.01)
*G02F 1/13357* (2006.01)

(58) Field of Classification Search
CPC ............ H05B 33/0887; H05B 33/0824; H05B 33/083; H05B 33/086; H05B 33/0812; H05B 37/02; G06F 3/04883; G06F 3/04886; G06F 2203/04101; G06F 3/0416; G06F 3/04842; G06F 3/016; G06F 3/0412; G06F 3/04817; G06F 3/017; G06F 3/0482; G06F 3/0486; G06F 3/0488; G06F 1/1652; G06F 2203/048
USPC ............... 315/246, 250, 287, 299, 302, 360; 345/102, 82, 156, 173, 104, 174, 204, 345/207, 212
See application file for complete search history.

(56) References Cited

U.S. PATENT DOCUMENTS

| | | | |
|---|---|---|---|
| 2011/0012521 A1* | 1/2011 | Byun | G09G 3/3406 315/186 |
| 2011/0157111 A1* | 6/2011 | Lee | G09G 3/3406 345/205 |
| 2013/0009557 A1* | 1/2013 | Szczeszynski | H05B 33/0827 315/186 |
| 2015/0054417 A1 | 2/2015 | Lee | |
| 2016/0210909 A1 | 7/2016 | Lee et al. | |

* cited by examiner

BACKLIGHT UNIT, METHOD OF DRIVING THE SAME, AND DISPLAY DEVICE INCLUDING THE SAME

CROSS-REFERENCE TO RELATED APPLICATION

Korean Patent Application No. 10-2016-0056631, filed on May 9, 2016, in the Korean Intellectual Property Office, and entitled: "Backlight Unit, Method of Driving the Same, and Display Device Including the Same," is incorporated by reference herein in its entirety.

BACKGROUND

1. Field

The present disclosure herein relates to a backlight unit and a display device including the same.

2. Description of the Related Art

As one of user interfaces, mounting a display device on an electronic device becomes required and in order for a light, thin, short, and small electronic device and its low power consumption, a flat display device is widely used as a display device.

Since a liquid crystal display (LCD), that is, the currently most popular flat display device, is a light receiving device that displays an image by adjusting the amount of light received from the outside, a backlight unit (BLU) including an additional light source for emitting light to a liquid crystal panel, that is, a backlight lamp, is required.

Recently, a light emitting diode (LED) having characteristics of a low power, eco-friendly, and slim design is extensively used as a light source. However, the LED has a difficulty in optical design in order to maintain the uniformity of brightness and color over the entire area of a display device, and requires a high technique for instantaneous control of an LED current for the combination of colors.

SUMMARY

An embodiment provides a backlight unit including: a power converter configured to generate a light source voltage in response to a power control signal; a light emitting element connected between a first node and a second node; and a light source controller connected to the second node and to output the power control signal in response to a dimming signal, wherein the light emitting element receives the light source power voltage through the first node. When a feedback voltage of the second node is less than or equal to a first reference voltage, the light source controller is to output the dimming signal and the power control signal having a first pulse width based on the feedback voltage. When the feedback voltage is higher than the first reference voltage, the light source controller is to output the dimming signal and the power control signal having a second pulse width based on a voltage lower than the feedback voltage. The second pulse width is narrower than the first pulse width.

In an embodiment, the light source controller may include: a comparison circuit configured to compare the feedback voltage with the first reference voltage and output a switching signal; a first feedback circuit to a first feedback signal based on the feedback voltage and the dimming signal when the switching signal is in a first level, a second feedback circuit to output a second feedback signal c based on a voltage lower than the feedback voltage and the dimming signal when the switching signal in a second level; and an output circuit configured to output the power control signal having a pulse width based on at least one of the first feedback signal and the second feedback signal and the dimming signal.

In an embodiment, the first feedback circuit may include: a first switching transistor including a first electrode connected to the second node, a second electrode connected to a third node, and a gate electrode connected to the switching signal; and a first feedback output circuit configured to compare the feedback voltage received through the third node with a second reference voltage and output the first feedback signal based on a comparison result.

In an embodiment, the second feedback circuit may include: an inverter configured to convert the switching signal into an inversion switching signal; a second switching transistor including a first electrode connected to the second node, a second electrode connected to a fourth node, and a gate electrode connected to the inversion switching signal; and a second feedback output circuit configured to compare the feedback voltage received through the fourth node with a second reference voltage and output the second feedback signal based on a comparison result.

In an embodiment, the second feedback output circuit may include: a comparator including a first input terminal to receive the feedback voltage, a second input terminal configured to receive the second reference voltage, and an output terminal to output the second feedback signal; a first capacitor connected between the first input terminal and the output terminal of the comparator; a second capacitor having one end connected to the output terminal; and a first resistor connected between the other end of the second capacitor and the first input terminal.

In an embodiment, a capacitance of the second capacitor and a resistance value of the first resistor may be set to allow a voltage level of the second feedback signal output from the comparator to be lower than the feedback voltage.

In an embodiment, the output circuit may include: a pulse generator to generate a pulse signal having a pulse width based on a voltage level of at least one of the first feedback signal and the second feedback signal; and a logic circuit to output the dimming signal and the power control signal having a pulse width based on the pulse signal.

In an embodiment, the logic circuit may output the power control signal in an activation level when each of the pulse signal and the dimming signal is in a first level; and the power converter may generate the light source power voltage when the power control signal is in the activation level.

In an embodiment, when the feedback voltage is less than or equal to the first reference voltage, the comparison circuit may output the switching signal of the first level to allow the first feedback circuit to operate and when the feedback voltage is higher than the first reference voltage, output the switching signal of the second level to allow the second feedback circuit to operate.

In an embodiment, a display device includes: a display panel including a plurality of pixels; a driving circuit configured to display an image on the display panel and output a dimming signal; and a backlight unit to supply light to the display panel. The backlight unit includes a power converter to generate a light source voltage in response to a power control signal, a light emitting element connected between a first node and a second node, and a light source controller connected to the second node and configured to output the power control signal based on a dimming signal, wherein the light emitting element receives the light source power voltage through the first node. When a feedback voltage of the second node is less than or equal to a first reference voltage, the light source controller outputs the dimming signal and the power control signal having a first pulse width based on the feedback voltage. When the feedback voltage is higher than the first reference voltage, the light source controller outputs the dimming signal and the power control signal having a second pulse width based on a voltage lower than the feedback voltage, wherein the second pulse width is narrower than the first pulse width.

In an embodiment, the light source controller may include: a comparison circuit to compare the feedback voltage with the first reference voltage and output a switching signal; a first feedback circuit to a first feedback signal corresponding to the feedback voltage and the dimming signal when the switching signal is in a first level; a second feedback circuit to output the dimming signal and a second feedback signal corresponding to a voltage less than or equal to the feedback voltage and when the switching signal in a second level; and an output circuit to output the dimming signal and the power control signal having a pulse width corresponding to at least one of the first feedback signal and the second feedback signal.

In an embodiment, the first feedback circuit may include: a first switching transistor including a first electrode connected to the second node, a second electrode connected to a third node, and a gate electrode connected to the switching signal; and a first feedback output circuit to compare the feedback voltage received through the first switching transistor with a second reference voltage and output the first feedback signal corresponding to a comparison result.

In an embodiment, the second feedback circuit may include: an inverter configured to convert the switching signal into an inversion switching signal; a second switching transistor including a first electrode connected to the second node, a second electrode connected to a fourth node, and a gate electrode connected to the inversion switching signal; and a second feedback output circuit to compare the feedback voltage received through the second switching transistor with a second reference voltage and output the second feedback signal based on a comparison result.

In an embodiment, the second feedback output circuit may include: a comparator including a first input terminal configured to receive the feedback voltage, a second input terminal configured to receive the second reference voltage, and an output terminal configured to output the second feedback signal; a first capacitor connected between the first input terminal and the output terminal of the comparator; a second capacitor having one end connected to the output terminal; and a first resistor connected between the other end of the second capacitor and the first input terminal.

In an embodiment, a capacitance of the second capacitor and a resistance value of the first resistor may be set to allow a voltage level of the second feedback signal output from the comparator to be lower than the feedback voltage.

In an embodiment, the output circuit may include: a pulse generator to generate a pulse signal having a pulse width based on a voltage level of at least one of the first feedback signal and the second feedback signal; and a logic circuit to output the dimming signal and the power control signal having a pulse width based on the pulse signal.

In an embodiment, when the feedback voltage is lower than the first reference voltage, the comparison circuit may output the switching signal of the first level to allow the first feedback circuit to operate and, when the feedback voltage is higher than the first reference voltage, output the switching signal of the second level to allow the second feedback circuit to operate.

In an embodiment, the driving circuit may include: a gate driver to drive a plurality of gate lines connected to the plurality of pixels, respectively; a data driver to drive a plurality of data lines connected to the plurality of pixels, respectively; and a timing controller to control the gate driver and the data driver, and output the dimming signal.

In an embodiment, provided is a method of driving a backlight unit. The method includes: comparing a feedback voltage fed back through a light emitting element with a first reference voltage; receiving a dimming signal; when the feedback voltage is less than or equal to the first reference voltage, outputting a first feedback signal; when the feedback voltage is higher than the first reference voltage, outputting a second feedback signal; outputting a power control signal corresponding to one of the first feedback signal and the second feedback signal and the dimming signal; and providing a light source power voltage to the light emitting element in response to the power control signal, wherein the second feedback signal has a lower voltage level than the first feedback signal.

In an embodiment, outputting the power control signal may include: when the first feedback signal is received as a feedback voltage of the second node is lower than a first reference voltage, outputting the power control signal having a first pulse width corresponding to the first feedback signal and the dimming signal; and when the second feedback signal is received as the feedback voltage is higher than the first reference voltage, outputting the power control signal having a second pulse width corresponding to the second feedback signal and the dimming signal, wherein the second pulse width is narrower than the first pulse width.

BRIEF DESCRIPTION OF THE DRAWING

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
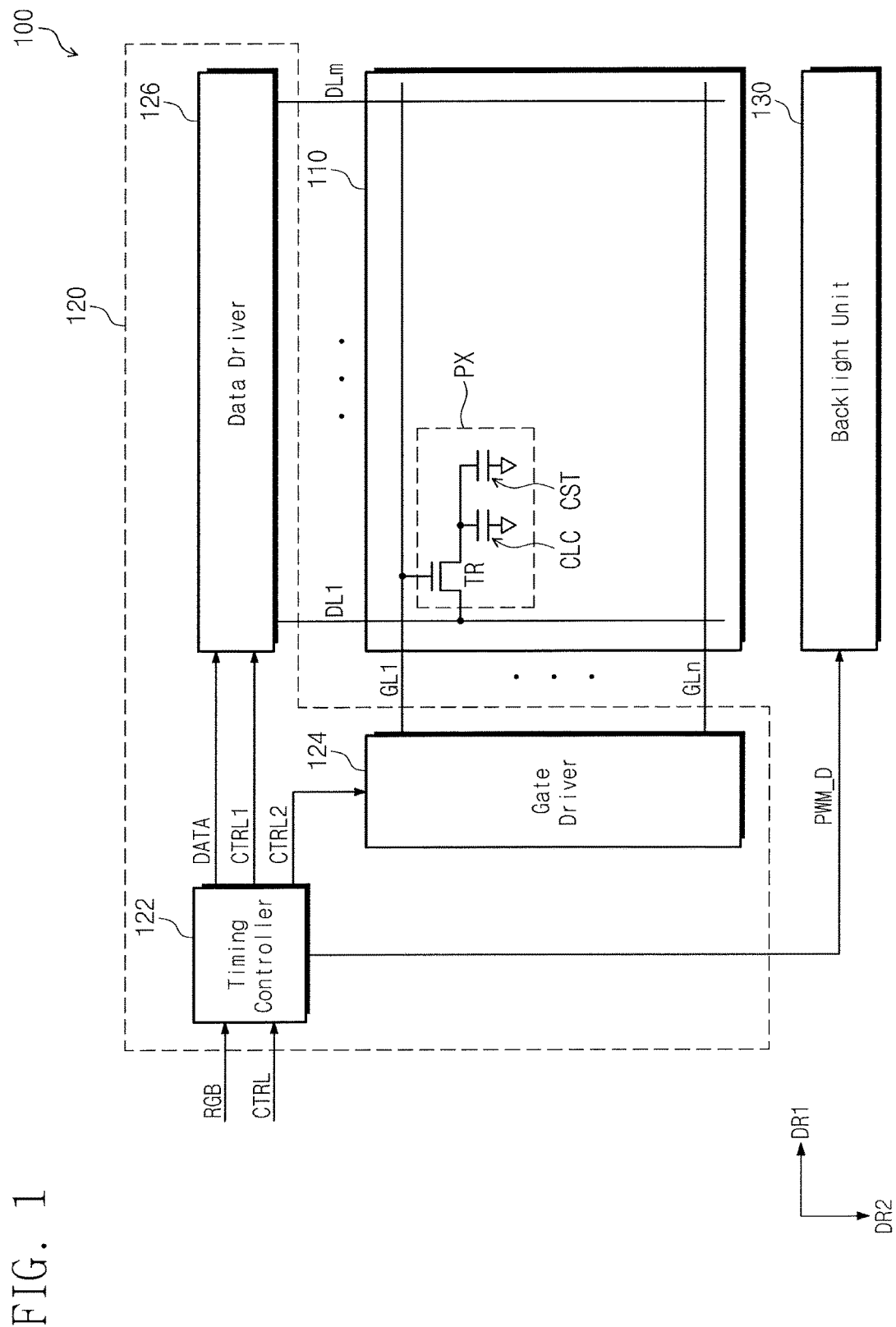
FIG. 1 illustrates a block diagram of a display device according to an embodiment.

FIG. 1 is a block diagram illustrating a display device according to an embodiment. Referring to FIG. 1, a display device 100 includes a display panel 110, a driving circuit 120, and a backlight unit 130.

The display panel 110 displays an image. In this embodiment, although it is described as one example that the display panel 110 is a liquid crystal display panel, the display panel 110 may be a different type of display panel that requires the backlight unit 130.

The display panel 110 includes a plurality of gate lines GL1 to GLn extending in a first direction DR1, a plurality of data lines DL1 to DLm extending in a second direction DR2, and a plurality of pixels PX arranged in an intersection area where the plurality of gate lines GL1 to GLn and the plurality of data lines DL1 to DLm intersect. The plurality of data lines DL1 to DLm and the plurality of gate lines GL1 to GLn are insulated from each other. Each of the pixels PX includes a thin film transistor TR, a liquid crystal capacitor CLC, and a storage capacitor CST.

The pixels PX are formed of the same structure. Accordingly, as a configuration of one pixel is described, description of each of the pixels PX is omitted. The thin film transistor TR of the pixel PX includes a gate electrode connected to the first gate line GL1 among the plurality of gate lines GL1 to GLn, a source electrode connected to the first data line DL1 among the plurality of data lines DL1 to DLm, and a drain electrode connected to the liquid crystal capacitor CLC and the storage capacitor CST. A first end of each of the liquid crystal capacitor CLC and the storage capacitor CST is connected in parallel to the drain electrode of the thin film transistor TR. A second end of each of the liquid crystal capacitor CLC and the storage capacitor CST is connected to a common voltage.

The driving circuit 120 includes a timing controller 122, a gate driver 124, and a data driver 126. The timing controller 122 receives an image signal RGB and a control signal CTRL from the outside. The control signals CTRL may include, e.g., a vertical sync signal, a horizontal sync signal, a main clock signal, and a data enable signal. Based on the control signals CTRL, the timing controller 122 provides a data signal DATA obtained by processing an image data RGB to meet an operation condition of the display panel 110 and a first control signal CRTL1 to the data driver 126, and provides a second control signal CTRL2 to the gate driver 124. The first control signal CTRL1 may include a horizontal sync start signal, a clock signal, and a line latch signal. The second control signal CTRL2 may include a vertical sync start signal, an output enable signal, and a gate pulse signal. The timing controller 122 may change the data signal DATA according to the arrangement of the pixels PX in the display panel 110 and a display frequency and may output the changed data signal DATA. The timing controller 122 may provide a dimming signal PWM_D for controlling the backlight unit 130 to the backlight unit 130.

The gate driver 124 drives the gate lines GL1 to GLn based on the second control signal CTRL2 from the timing controller 122. The gate driver 124 may include a gate driving integrated circuit (IC). The gate driver 124 may be also implemented as a circuit using an oxide semiconductor, an amorphous semiconductor, a crystalline semiconductor, and a polycrystalline semiconductor.

The data driver 122 drives the data lines DL1 to DLm in response to the data signal DATA and the first control signal CONT1 from the timing controller 122.

The backlight unit 130 may be disposed at the lower part of the display panel 110 to face the pixels PX. The backlight unit 130 operates based on the dimming signal PWM_D from the timing controller 122. A specific configuration and operation of the backlight unit 130 will be described in detail with reference to FIG. 2.

Figure 2:
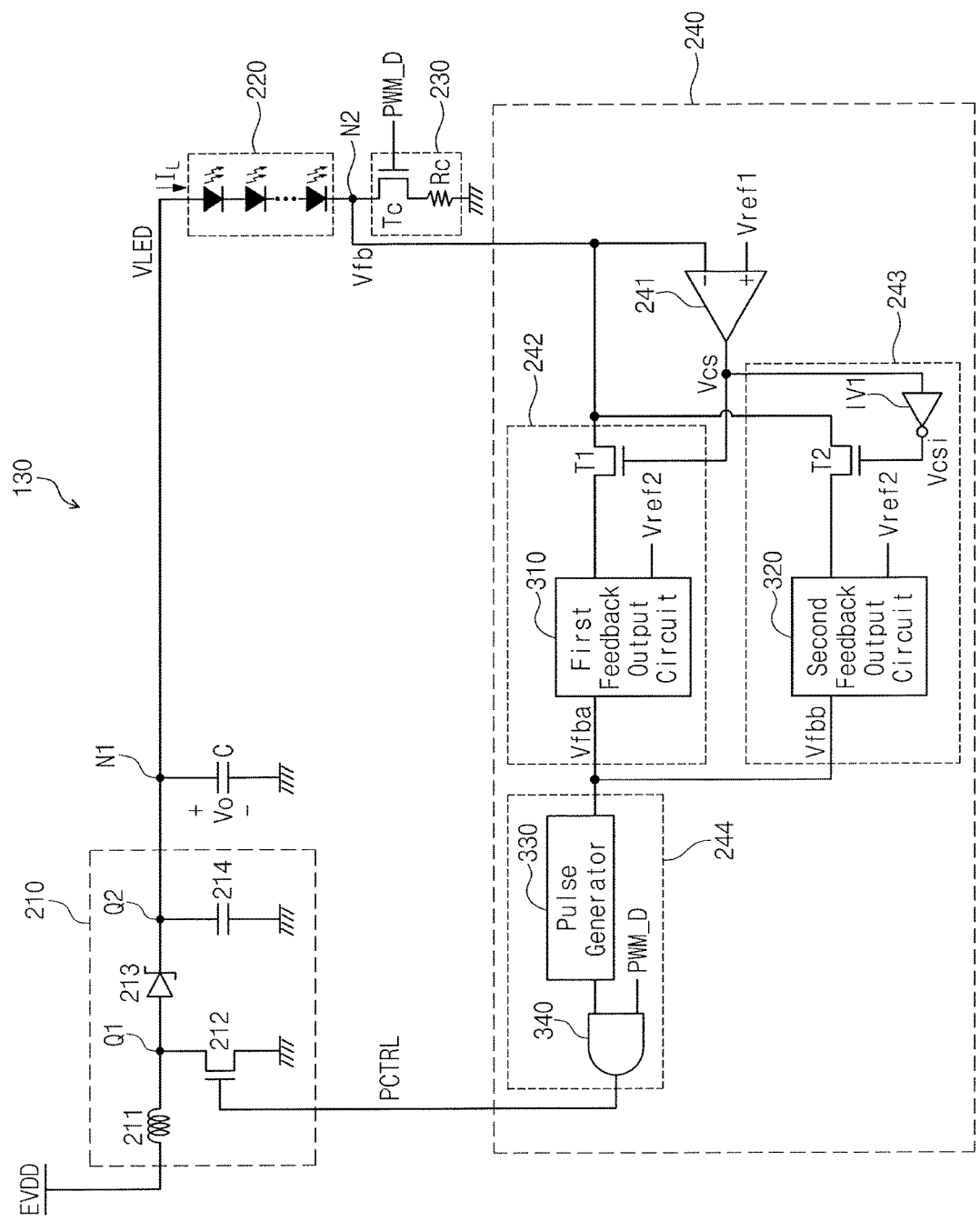
FIG. 2 illustrates a view illustrating a configuration of a backlight unit shown in FIG. 1.

FIG. 2 is a view illustrating a configuration of a backlight unit shown in FIG. 1. Referring to FIG. 2, the backlight unit 130 includes a power converter 210, a light emitting element 22, a current control circuit 230, a light source controller 240, and an output capacitor C.

The power converter 210 converts a power supply voltage EVDD input from the outside into a light source power supply voltage VLED. The voltage level of the light source power supply voltage VLED is required to be set to a voltage level sufficient for driving light emitting diodes in the light emitting element 220.

The power converter 210 includes an inductor 211, a transistor 212, a diode 213, and a capacitor 214. The inductor 211 is connected between a power supply voltage EVDD supplied from the outside and a node Q1. The transistor TR16 includes a first electrode connected to the node Q1, a second electrode connected to a ground terminal, and a control electrode connected to a power control signal PCTRL. The diode 213 is connected between the node Q1 and a node Q2. In this embodiment, the diode 213 may be a Schottky diode. The capacitor 214 is connected between the node Q2 and the ground terminal. The light source power supply voltage VLED of the node Q2 is supplied to one end of the light emitting element 220 through a first node N1.

The power converter 210 may be configured as one of various types of DC/DC converters such as a buck-boost type, a boost type, and a high-bridge type. The power converter 210 having the configuration as shown in FIG. 2 converts the power supply voltage EVDD supplied from the outside into the light source power supply voltage VLED and outputs it. In particular, the voltage level of the light source power supply voltage VLED may be adjusted by turning on/off the transistor 212 in response to the power supply control signal PCTRL applied to the gate of the transistor 212.

The light emitting element 220 may include a light emitting diode string having a plurality of light emitting diodes (LEDs) connected in series. In this embodiment, although it is described that the light emitting element 220 includes one light emitting diode string, the number of light emitting diode strings included in the light emitting element 220 may be variously changed.

Each of the plurality of LEDs may include a white LED that emits white light, a red LED that emits red light, a blue LED that emits blue light, and a green LED that emits green light. In order to reduce power consumption, the LEDs may include LEDs driven with a generally low forward driving voltage. In addition, the deviation of the forward driving voltage of LEDs may be smaller for increased brightness uniformity. In this embodiment, the light emitting element 220 may include LEDs, but may include a laser diode, a carbon nanotube, and so forth, instead of or in addition to LEDs.

A first end of the light emitting element 220 is connected to the first node N1 to receive the light source power voltage VLED from the power converter 210. The second node N2, connected to a second end of the light emitting device 220, is connected to the current control circuit 230 and the light source controller 240.

The current control circuit 230 includes a current control transistor Tc and a resistor Rc. The current control transistor Tc includes a first electrode connected to the second node N2, a second electrode connected to one end of the resistor Rc, and a gate electrode for receiving the dimming signal PWM_D. The resistor Rc is connected between the second electrode of the current control transistor Tc and the ground terminal. The dimming signal PWM_D is a signal provided from the timing controller 122 shown in FIG. 1. The current control transistor Tc is turned on while the dimming signal PWM_D is in a high level so that a current from the power converter 210 flows through the light source element 220.

The light source controller 240 compares a feedback voltage Vfb of the second node N2 with a first reference voltage Vref1 and outputs the power supply control signal PCTRL corresponding to a voltage based on the comparison result and the dimming signal PWM_D. For example, when the feedback voltage Vfb is less than or equal to the first reference voltage Vref1, the light source controller 240 outputs the power supply control signal PCTRL corresponding to the feedback voltage Vfb and the dimming signal PWM_D. When the feedback voltage Vfb is greater than the first reference voltage Vref1, the light source controller 240 outputs the power supply control signal PCTRL corresponding a voltage lower than the feedback voltage Vfb and the dimming signal PWM_D.

The light source controller 240 may include a comparison circuit 241, a first feedback circuit 242, a second feedback circuit 243, and an output circuit 244. The comparison circuit 241 compares the feedback voltage Vfb with the first reference voltage Vref1 and outputs a switching signal Vcs based on the comparison result. The comparison circuit 241 includes a first input terminal for receiving the feedback voltage Vfb, a second input terminal for receiving the first reference voltage Vref1, and an output terminal for outputting the switching signal Vcs. When the feedback voltage Vfb is less than or equal to the first reference voltage Vref1, the comparison circuit 241 outputs the switching signal Vcs of a first level (i.e., a high level). When the feedback voltage Vfb is greater than the first reference voltage Vref1, the comparison circuit 241 outputs the switching signal Vcs outputs the switching signal Vcs of a second level (i.e., a low level).

When the switching signal Vcs is in the first level, the first feedback circuit 242 outputs a first feedback signal Vfba corresponding to the feedback voltage Vfb and the dimming signal PWM_D. The first feedback circuit 242 may include a first switching transistor T1 and a first feedback output circuit 310. The first switching transistor T1 includes a first electrode connected to the second node N2, a second electrode connected to the third node N3, and a gate electrode for receiving the switching signal Vcs. The first switching transistor T1 is turned on when the switching signal Vcs is in the first level and delivers the feedback voltage Vfb to the third node N3. The first feedback output circuit 310 compares the feedback voltage Vfb delivered to the third node N3 and the second reference voltage Vref2 and outputs a first feedback signal Vfba based on the comparison result. The second reference voltage Vref2 may be the same as or different from the first reference voltage Vref1.

When the switching signal Vcs is in the second level, the second feedback circuit 243 outputs a second feedback signal Vfbb based on the feedback voltage Vfb and the dimming signal PWM_D. The second feedback circuit 243 may include an inverter IV1, a second switching transistor T2, and a second feedback output circuit 320. The inverter IV1 inverts the switching signal Vcs and outputs the inverted switching signal Vcsi. The switching transistor T2 includes a first electrode connected to the second node N2, a second electrode connected to the fourth node N4, and a gate electrode for receiving the inverted switching signal Vcsi. The second switching transistor T2 is turned on when the inverted switching signal Vcsi is in the first level (i.e., when the switching signal Vcs is in the second level) to deliver the feedback voltage Vfb to the fourth node N4. The second feedback output circuit 320 compares the feedback voltage Vfb delivered to the fourth node N4 and the second reference voltage Vref2 and outputs a second feedback signal Vfbb based on the comparison result.

The output circuit 244 may include a pulse generator 330 and a logic circuit 340. The pulse generator 330 generates a pulse signal based on one of the first feedback signal Vfba from the first feedback circuit 242 or the second feedback signal Vfbb from the second feedback circuit 243.

For example, if the feedback voltage Vfb is less than or equal to the first reference voltage Vref1, the first feedback signal Vfba from the first feedback circuit 242 is provided to the pulse generator 330. On the other hand, if the feedback voltage Vfb is greater than the first reference voltage Vref1, the second feedback signal Vfbb from the second feedback circuit 243 is provided to the pulse generator 330.

The pulse generator 330 outputs a pulse signal having a pulse width corresponding to the voltage level of the received signal. For example, as the voltage level of the received signal increases, a pulse signal having a narrower pulse width is output, and, as the voltage level of the received signal decreases, a pulse signal having a wider pulse width is output.

The logic circuit 340 may be configured with an AND gate. The logic circuit 340 receives the pulse signal and the dimming signal PWM_D from the pulse generator 330 and outputs the power control signal PCTRL.

Figure 3:
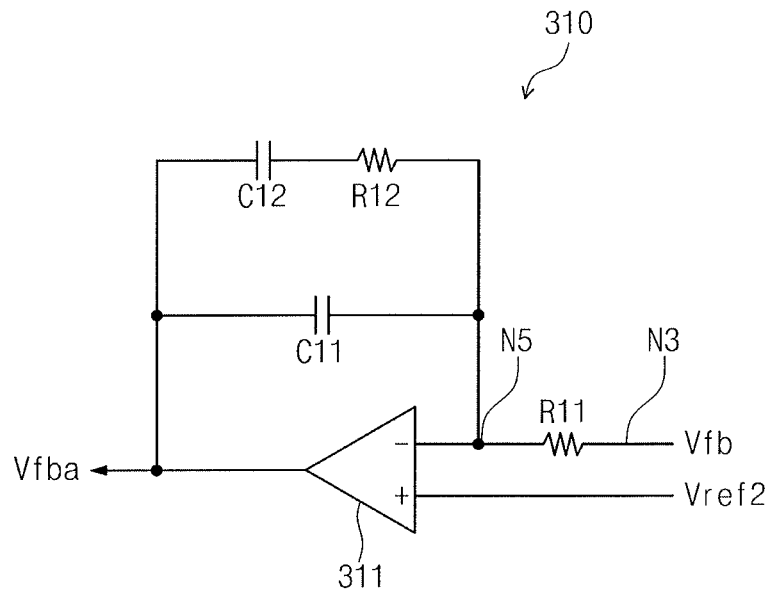
FIG. 3 illustrates a view illustrating a configuration of a first feedback output circuit shown in FIG. 2.

FIG. 3 is a view illustrating a configuration of a first feedback output circuit shown in FIG. 2. Referring to FIG. 3, the first feedback output circuit 310 may include a comparator 311, a first capacitor C11, a second capacitor C12, a first resistor R11, and a second resistor R12. The first resistor R11 is connected between a third node N3 and a fifth node N5 shown in FIG. 2.

The comparator 311 includes a first input terminal for receiving the feedback voltage Vfb delivered through the first resistor R11, a second input terminal for receiving the second reference voltage Vref2, and an output terminal for outputting the first feedback signal Vfba. The first capacitor C11 is connected between the fifth node N5 and the output terminal of the comparator 311. A first end of the second capacitor C12 is connected to the output terminal of the comparator 311 and a second end of the second capacitor is connected to a first end of the second resistor R12. The second resistor R12 is connected between the second end of the second capacitor C12 and the fifth node N5 where the feedback voltage Vfb is delivered, e.g., a second end of the second resistor R12 is connected to the fifth node N5.

The comparator 311 compares the feedback voltage Vfb with the second reference voltage Vref2 and outputs the first feedback voltage Vfba based on to the comparison result. The first feedback voltage Vfba may determine a voltage level according to each capacitance of the first capacitor C11 and the second capacitor C12 and a resistance value of the second resistor R12, in addition to the comparison result of the feedback voltage Vfb and the second reference voltage Vref2.

Figure 4:
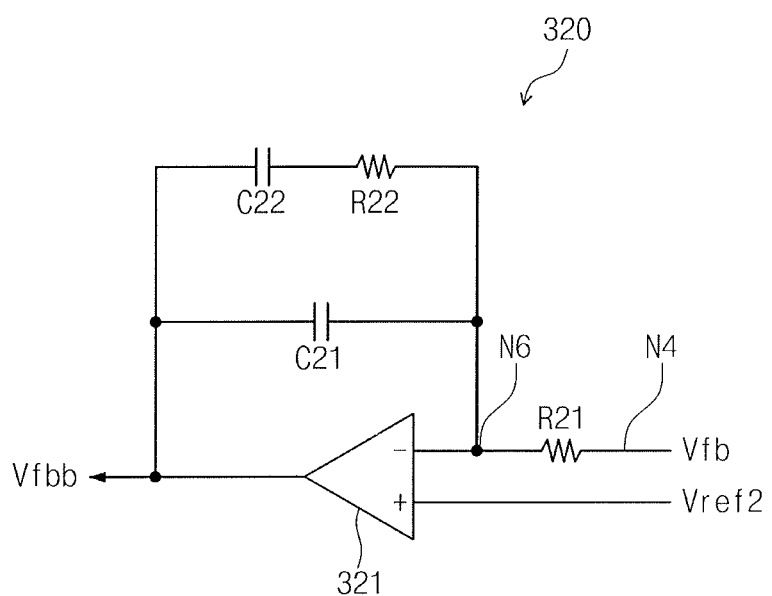
FIG. 4 illustrates a view of a configuration of a second feedback output circuit shown in FIG. 2.

FIG. 4 is a view illustrating a configuration of a second feedback output circuit shown in FIG. 2. Referring to FIG. 4, the second feedback output circuit 320 may include a comparator 321, a first capacitor C21, a second capacitor C22, a first resistor R21, and a second resistor R22. The first resistor R21 is connected between a fourth node N4 and a sixth node N6 shown in FIG. 2.

The comparator 321 includes a first input terminal for receiving the feedback voltage Vfb delivered through the first resistor R21, a second input terminal for receiving the second reference voltage Vref2, and an output terminal for outputting the first feedback signal Vfbb. The first capacitor C21 is connected between the sixth node N6 and the output terminal of the comparator 321. The second capacitor C22 is connected between the output terminal of the comparator 321 and a first end of the second resistor R22. The second resistor R22 is connected between the second capacitor C22 and the sixth node N6 where the feedback voltage Vfb is delivered.

The comparator 321 compares the feedback voltage Vfb with the second reference voltage Vref2 and outputs the second feedback voltage Vfbb corresponding to the comparison result. The second feedback voltage Vfbb may determine a voltage level according to each capacitance of the first capacitor C21 and the second capacitor C22 and a resistance value of the second resistor R22 in addition to the comparison result of the feedback voltage Vfb and the second reference voltage Vref2.

Referring to FIGS. 3 and 4, it is assumed that the capacitances of the first capacitor C11 in the first feedback output circuit 310 and the first capacitor C21 in the second feedback output 320 are the same and the resistance values of the first resistor R11 in the feedback output circuit 310 and the second resistor R21 in the second feedback output circuit 320 are the same. The capacitance of the second capacitor C22 in the second feedback output circuit 320 is greater than the capacitance of the second capacitor C12 in the first feedback output circuit 310, and the resistance value of the second resistor R22 in the second feedback output circuit 320 is greater than the resistance value of the second resistor R12 in the first feedback output circuit 310. For example, the capacitance of the second capacitor C12 in the first feedback output 310 is 10 nF and the capacitance of the second capacitor C22 in the second feedback output 320 is 1000 nF. For example, the resistance value of the second resistor R12 in the first feedback output circuit 310 is 5 kΩ and the resistance value of the second resistor R22 in the second feedback output circuit 320 is 500 kΩ. In other words, the capacitance of the second capacitor C22 may be two orders of magnitude greater that the capacitance of the second capacitor C12 and the resistance value of the second resistor R22 may be two order of magnitude greater that the resistance value of the second resistor R12.

The second comparator 321 operates as an integrator. When the capacitance of the second capacitor C22 and the resistance value of the second resistor R22, which are connected between the first input terminal (i.e., the inversion input terminal) and the output terminal of the second comparator 321 increases, the response speed of the second comparator 321 decreases. Therefore, the response speed of the second comparator 321 is slower than the response speed of the first comparator 311 with respect to the feedback signal Vfb of the same voltage level, so that the voltage level of the second feedback signal Vfbb output from the second comparator 321 is lower than the voltage level of the first feedback signal Vfba.

Figure 5:
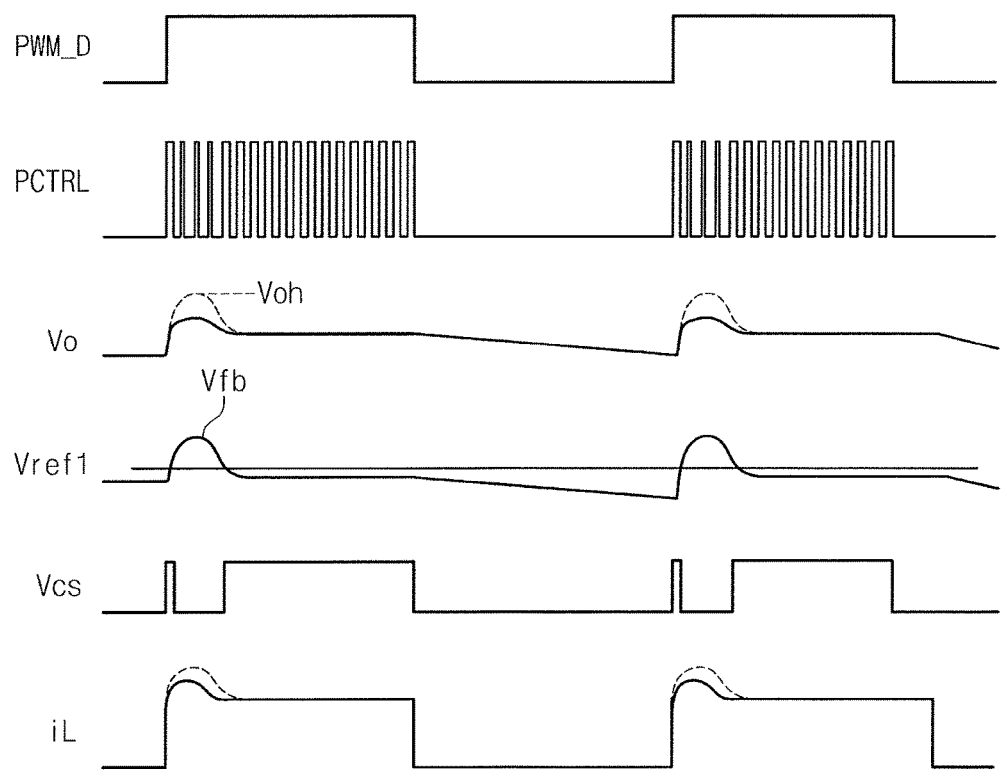
FIG. 5 illustrates a timing diagram of an operation of a backlight unit shown in FIG. 2.

FIG. 5 is a timing diagram illustrating an operation of a backlight unit shown in FIG. 2. Referring to FIGS. 1 and 2, a dimming method for controlling the on/off time of the light source converter 210 is used to adjust brightness of the light source element 220. That is, the brightness of the light source element 220 may be adjusted by periodically turning on/off the generation of the light source power source voltage VLED.

When the light source converter 210 changes from an off state to an on state, a ripple that the light source power supply voltage VLED rapidly increases may occur. When a ripple occurs from the light source power supply voltage VLED supplied to the light emitting element 220, the brightness of an image displayed on the display panel 110 may not be uniform. However, as described below, this ripple may be minimized by preventing the light source power supply voltage VLED from rapidly increasing during this transition.

Referring to FIGS. 1 to 5, the dimming signal PWM_D provided from the timing controller 122 is a pulse signal that periodically transitions to a high level and a low level. The current control transistor Tc in the current control circuit 230 is turned on while the dimming signal PWM_D is in a high level so that a current path may be formed between the first node N1 and the second node N2. While the dimming signal PWM_D is in a high level, the light emitting element 220 may emit light with the brightness based on the voltage level of the light source power supply voltage VLED.

While the dimming signal PWM_D is in a high level, the light source controller 240 compares the feedback voltage Vfb with the first reference voltage Vref1 and outputs the power supply control signal PCTRL based on the comparison result. While the dimming signal PWM_D is in a high level, as the power source control signal PCTRL transitions to a high level and a low level repetitively, the transistor 212 is turned on/off repeatedly, so that a desired level of the light source power voltage VLED may occur.

The current control transistor Tc in the current control circuit 230 is turned off while the dimming signal PWM_D is in a low level so that the current path between the first node N1 and the second node N2 is cut off and the light emitting element 220 does not emit light. When the dimming signal PWM_D transitions from a low level to a high level, an output voltage Vo across the both ends of the output capacitor C connected between the first node N1 and the ground terminal rapidly rises to a high voltage level Voh, as illustrated by the dashed line in FIG. 5. The output voltage Vo across the both ends of the output capacitor C is provided to the light source unit 220 as the light source power supply voltage VLED.

The first comparator 241 compares the feedback voltage Vfb with the first reference voltage Vref1. When the feedback voltage Vfb is higher than the first reference voltage Vref1, the first comparator 241 outputs a low level of the switching signal Vcs. When the switching signal Vcs is in a low level, the first switching transistor T1 is turned off and the second switching transistor T2 is turned on, so that the second feedback signal Vfbb from the second feedback output 320 is provided to the pulse generator 330. As described with reference to FIGS. 3 and 4, since the response speed of the second comparator 321 is slower than the response speed of the first comparator 311, the voltage level of the second feedback signal Vfbb output from the second comparator 321 is lower than the voltage level of the feedback voltage Vfb.

The pulse generator 330 outputs a pulse signal corresponding to the voltage level of the second feedback signal Vfbb. The logic circuit 340 receives the pulse signal and the dimming signal PWM_D from the pulse generator 330 and outputs the power control signal PCTRL.

Since the voltage level of the second feedback signal Vfbb is lower than the voltage level of the first feedback signal Vfba, the pulse width of the power control signal PCTRL while the switching signal Vcs is in a low level is narrower than the pulse width of the power control signal PCTRL while the switching signal Vcs is in a high level. As the pulse width of the power control signal PCTRL is narrower, the output voltage Vo across the both ends of the output capacitor C becomes lower. Therefore, the output voltage Vo across the both ends of the output capacitor C may be lowered during a transient section where the dimming signal PWM_D transitions from a low level to a high level, as illustrated by the solid line in FIG. 5.

After the output voltage Vo across the both ends of the output capacitor C is stabilized, if the feedback voltage Vfb is less than or equal to the first reference voltage Vref1, the switching signal Vcs transitions to a high level. When the switching signal Vcs is in a high level, the second switching transistor T2 is turned off and the first switching transistor T1 is turned on, so that the first feedback signal Vfba from the first feedback output 310 is provided to the pulse generator 330. Since the first feedback output circuit 310 outputs the first feedback signal Vfba corresponding to the feedback voltage Vfb, the power control signal PCTRL has a pulse width corresponding to the feedback voltage Vfb.

Figure 6:
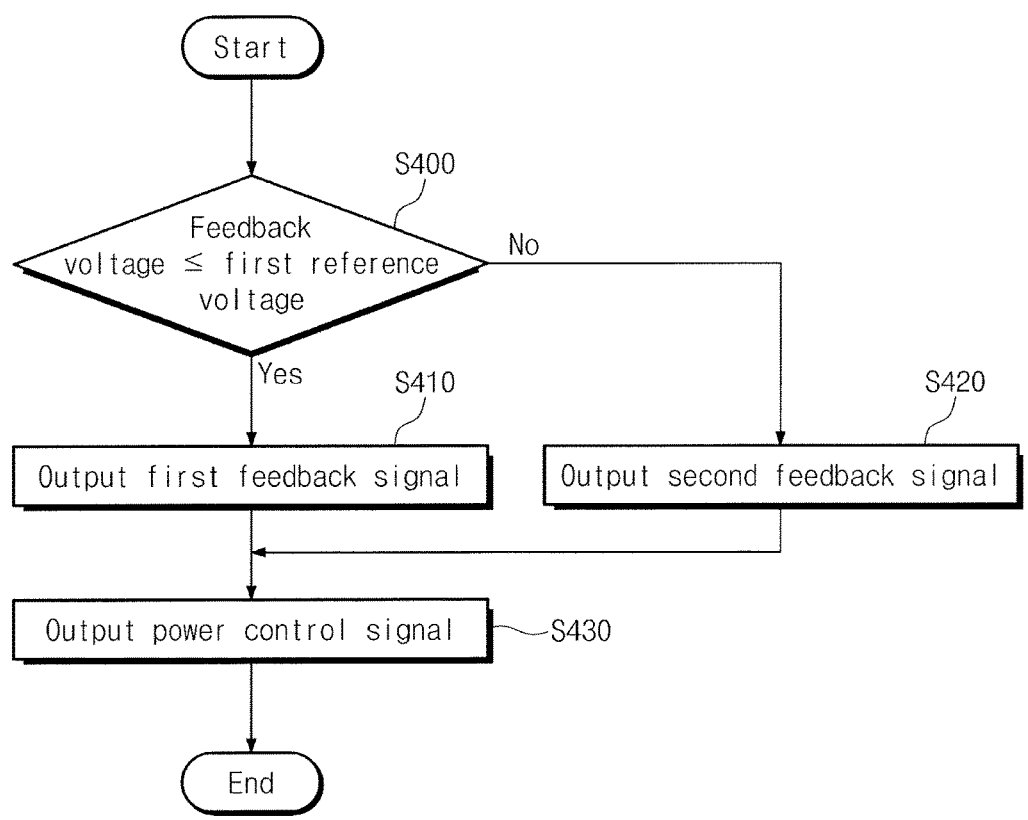
FIG. 6 illustrates a flowchart of an operation of a backlight unit shown in FIG. 2.

FIG. 6 is a flowchart illustrating an operation of a backlight unit shown in FIG. 2. Referring to FIGS. 2 and 6, the light source controller 240 compares the feedback voltage Vfb with the first reference voltage Vref1 in operation S400. If the feedback voltage Vfb is less than or equal to the first reference voltage Vref1, the first feedback output circuit 310 outputs the first feedback signal Vfba in operation S410. If the feedback voltage Vfb is higher than the first reference voltage Vref1, the second feedback output circuit 320 outputs the second feedback signal Vfbb in operation S420. While the dimming signal PWM_D is in a high level, the pulse generator 330 outputs the power control signal PCTRL having a first pulse width corresponding to the first feedback signal Vfba from the first feedback output circuit 310 or a second pulse width corresponding to the second feedback signal Vfbb from the second feedback output circuit 320. The second pulse width corresponding to the second feedback signal Vfbb is narrower than the first pulse width corresponding to the first feedback signal Vfba.

The voltage level of the second feedback signal Vfbb from the second feedback output circuit 320 is lower than the voltage levels of the first feedback signal Vfba and the feedback voltage Vf. Therefore, if the feedback voltage Vfb is higher than the first reference voltage Vref1, the power control signal PCTRL having a pulse width corresponding to a voltage lower than the feedback voltage Vf may be output. Therefore, when the light source converter 210 changes from an off state to an on state, a ripple phenomenon that the light source power supply voltage VLED rapidly increases may be minimized.

By way of summation and review, according to one or more embodiments, a backlight unit may minimize a ripple phenomenon of a light source power voltage supplied to a light emitting element. Therefore, it is possible to prevent the quality deterioration of an image displayed on a display device. Thus, a backlight unit, a method of driving the same, and a display device including the same may provide a stable voltage to a light emitting element even during a transition period.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A backlight unit, comprising:
    a power converter to generate a light source power voltage in response to a power control signal;
    a light emitting element connected between a first node and a second node; and
    a light source controller connected to the second node and to output the power control signal in response to a dimming signal, wherein
    the light emitting element receives the light source power voltage through the first node;
    the light source controller includes:
        a comparison circuit configured to compare a feedback voltage of the second node with a first reference voltage, the comparison circuit being configured to output a switching signal;
        a first feedback circuit to output a first feedback signal based on the feedback voltage when the switching signal is in a first level;
        a second feedback circuit to output a second feedback signal based on a voltage lower than the feedback voltage when the switching signal in a second level; and
        an output circuit to output the power control signal, the power control signal having a pulse width based on at least one of the first feedback signal or the second feedback signal, and
    the light source controller is to output the power control signal having a first pulse width based on the first feedback signal voltage when the feedback voltage of the second node is lower than or equal to the first reference voltage, and
    the power control signal having a second pulse width based on the second feedback signal when the feedback voltage is higher than the first reference voltage; and
    the second pulse width is narrower than the first pulse width.

2. The backlight unit as claimed in claim 1, wherein the first feedback circuit includes:
    a first switching transistor including a first electrode connected to the second node, a second electrode connected to a third node, and a gate electrode connected to the switching signal; and
    a first feedback output circuit configured to compare the feedback voltage received through the third node with a second reference voltage, the first feedback output circuit being configured to output the first feedback signal based on a comparison result.

3. The backlight unit as claimed in claim 1 wherein the second feedback circuit includes: an inverter configured to convert the switching signal into an inversion switching signal; a second switching transistor including a first electrode connected to the second node, a second electrode connected to a fourth node, and a gate electrode connected to the inversion switching signal: and
    a second feedback output circuit configured to compare the feedback voltage received through the fourth node with the voltage that is a second reference voltage, the second feedback output circuit being configured to output the second feedback signal based on a comparison result.

4. The backlight unit as claimed in claim 3, wherein the second feedback output circuit includes:

a comparator including a first input terminal to receive the feedback voltage, a second input terminal to receive the second reference voltage, and an output terminal to output the second feedback signal;
a first capacitor connected between the first input terminal and the output terminal of the comparator;
a second capacitor having a first end connected to the output terminal; and
a first resistor connected between a second end of the second capacitor and the first input terminal.

5. The backlight unit as claimed in claim 4, wherein a capacitance of the second capacitor and a resistance value of the first resistor are set to allow a voltage level of the second feedback signal output from the comparator to be lower than the feedback voltage.

6. The backlight unit as claimed in claim 1, wherein the output circuit includes:
a pulse generator to generate a pulse signal having a pulse width corresponding to a voltage level of at least one of the first feedback signal and the second feedback signal; and
a logic circuit to output the power control signal having a pulse width based on the pulse signal and the dimming signal.

7. The backlight unit as claimed in claim 6, wherein:
the logic circuit outputs the power control signal in an activation level when each of the pulse signal and the dimming signal is in a first level; and
the power converter generates the light source power voltage when the power control signal is in the activation level.

8. The backlight unit as claimed in claim 1, wherein:
when the feedback voltage is lower than the first reference voltage, the comparison circuit outputs the switching signal of the first level to allow the first feedback circuit to operate, and
when the feedback voltage is higher than the first reference voltage, the comparison circuit outputs the switching signal of the second level to allow the second feedback circuit to operate.

9. A display device, comprising:
a display panel including a plurality of pixels;
a driving circuit to display an image on the display panel and to output a dimming signal; and
a backlight unit to supply light to the display panel,
wherein the backlight unit includes:
a power converter to generate a light source power voltage based on to a power control signal;
a light emitting element connected between a first node and a second node; and
a light source controller connected to the second node, the light source controller to output the power control signal based on the dimming signal,
wherein the light emitting element receives the light source power voltage through the first node; and
the light source controller includes:
a comparison circuit configured to compare a feedback voltage of the first node with a first reference voltage, the comparison circuit being configured to output a switching signal;
a first feedback circuit to output a first feedback signal based on the feedback voltage when the switching signal is in a first level;
a second feedback circuit to output a second feedback signal based on a voltage lower than the feedback voltage when the switching signal in a second level; and
an output circuit to output the power control signal, the power control signal having a pulse width based on at least one of the first feedback signal or the second feedback signal, and
when the feedback voltage of the second node is less than or equal to the first reference voltage, the light source controller is to output the power control signal having a first pulse width based on the first feedback signal, and
when the feedback voltage is greater than the first reference voltage, the light source controller is to output the power control signal having a second pulse width corresponding to the second feedback signal, wherein the second pulse width is narrower than the first pulse width.

10. The display device as claimed in claim 9, wherein the first feedback circuit includes:
a first switching transistor including a first electrode connected to the second node, a second electrode connected to a third node, and a gate electrode connected to the switching signal; and
a first feedback output circuit to compare the feedback voltage received through the first switching transistor with a second reference voltage and output the first feedback signal based on a comparison result.

11. The display device as claimed in claim 9, wherein the second feedback circuit includes: an inverter configured to convert the switching signal into an inversion switching signal; a second switching transistor including a first electrode connected to the second node, a second electrode connected to a fourth node, and a gate electrode connected to the inversion switching signal; and
a second feedback output circuit configured to compare the feedback voltage received through the second switching transistor with the voltage that is a second reference voltage, the second feedback output circuit being configured to output the second feedback signal based on a comparison result.

12. The display device as claimed in claim 11, wherein the second feedback output circuit includes:
a comparator including a first input terminal to receive the feedback voltage, a second input terminal to receive the second reference voltage, and an output terminal to output the second feedback signal;
a first capacitor connected between the first input terminal and the output terminal of the comparator;
a second capacitor having one end connected to the output terminal; and
a first resistor connected between the other end of the second capacitor and the first input terminal.

13. The display device as claimed in claim 12, wherein a capacitance of the second capacitor and a resistance value of the first resistor are set to allow a voltage level of the second feedback signal output from the comparator to be lower than the feedback voltage.

14. The display device as claimed in claim 9, wherein the output circuit includes:
a pulse generator to generate a pulse signal having a pulse width based on a voltage level of at least one of the first feedback signal and the second feedback signal; and
a logic circuit to output the power control signal having a pulse width based on the pulse signal and the dimming signal.

15. The display device as claimed in claim 9, wherein:
when the feedback voltage is lower than the first reference voltage, the comparison circuit outputs the switching signal of the first level to allow the first feedback circuit to operate, and
when the feedback voltage is higher than the first reference voltage, the comparison circuit outputs the switching signal of the second level to allow the second feedback circuit to operate.

16. The display device as claimed in claim 9, wherein the driving circuit includes:
a gate driver to drive a plurality of gate lines connected to the plurality of pixels, respectively;
a data driver to drive a plurality of data lines connected to the plurality of pixels, respectively; and
a timing controller to control the gate driver and the data driver, and output the dimming signal.

17. A method of driving a backlight unit, the method comprising:
comparing a feedback voltage fed back through a light emitting element with a first reference voltage and outputting a switching signal is response thereto;
receiving a dimming signal;
when the switching signal is in a first level, outputting a first feedback signal;
when the switching signal is in a second level, outputting a second feedback signal;
outputting a power control signal corresponding to one of the first feedback signal or the second feedback signal; and
providing a light source power voltage to the light emitting element based on the power control signal,
wherein the second feedback signal has a lower voltage level than the first feedback signal, and
wherein, outputting the power control signal includes
when the feedback voltage is less than or equal to the first reference voltage, outputting the power control signal having a first pulse width based on the first feedback signal, and
when the feedback voltage is greater than the first reference voltage, outputting the power control signal having a second pulse width corresponding to the second feedback signal, wherein the second pulse width is narrower than the first pulse width.

* * * * *